United States Patent [19]

Hergesheimer

[11] Patent Number: 5,471,213

[45] Date of Patent: Nov. 28, 1995

[54] MULTIPLE REMOTED WEAPON ALERTING AND CUEING SYSTEM

[75] Inventor: Peter D. Hergesheimer, La Habra, Calif.

[73] Assignee: Hughes Aircraft Company, Los Angeles, Calif.

[21] Appl. No.: 280,264

[22] Filed: Jul. 26, 1994

[51] Int. Cl.$^6$ ............................ G01S 13/86; F41G 7/28; F41G 5/08

[52] U.S. Cl. .............................. 342/67; 342/59; 244/3.14; 89/1.11; 89/41.07

[58] Field of Search ................................ 342/67, 59, 13; 244/3.1, 3.14; 89/1.11, 41.07

[56] References Cited

U.S. PATENT DOCUMENTS

| | | | |
|---|---|---|---|
| 3,974,740 | 8/1976 | Billottet et al. | 89/41 SW |
| 4,205,589 | 6/1980 | Engler et al. | 89/41 SW |
| 4,267,562 | 5/1981 | Raimondi | 89/41 TV |
| 4,730,104 | 3/1988 | Rogers | 235/412 |
| 4,780,719 | 10/1988 | Frei et al. | 342/67 |
| 4,949,089 | 8/1990 | Ruszkowski, Jr. | 342/52 |
| 5,118,050 | 6/1992 | Arnold et al. | 244/3.14 |
| 5,294,930 | 3/1994 | Li | 342/13 |
| 5,379,676 | 1/1995 | Profeta et al. | 89/41.07 |

Primary Examiner—Charles T. Jordan.
Assistant Examiner—Theresa M. Wesson
Attorney, Agent, or Firm—Jeannette M. Walder; W. K. Denson-Low

[57] ABSTRACT

A weapon alerting and cueing system including a weapon terminal responsive to radar track information for radar detected aircraft; a first weapon launcher operated by a first weapon operator; a first weapon pointing sensor for providing azimuth and elevation information about the first weapon launcher; a first cueing sight for providing visual pointing cues to the first weapon operator; a first weapon cueing processor responsive to the radar track information, the weapon terminal, and the first pointing sensor for controlling the first cueing sight such that the first cueing sight provides visual cues for cueing the first weapon launcher to a selected radar detected aircraft target; a second weapon launcher operated by a second weapon operator; a second weapon pointing sensor for providing azimuth and elevation information about the second weapon launcher; a second cueing sight for providing visual pointing cues to the second weapon operator; a second weapon processor responsive to the radar track information, the weapon terminal, and the second pointing sensor for controlling the second cueing sight such that the second cueing sight provides visual cues for cueing the second weapon launcher to a selected radar detected aircraft target; and a plurality of RF modems for interconnecting the weapon terminal, the first weapon processor, and the second weapon processor.

6 Claims, 2 Drawing Sheets

MULTIPLE REMOTED WEAPON ALERTING AND CUEING SYSTEM

BACKGROUND OF THE INVENTION

The disclosed invention relates generally to weapon alerting and cueing systems, and more particularly to a weapon alerting and cueing system for remotely alerting and cueing, in a simultaneous manner, multiple man-operated weapons to multiple radar detected aircraft.

Handheld or so-called "manpad" weapon systems have been developed to substantially improve the air defense capabilities of surface-based military units. An example of such manpad weapons systems is the Stinger missile, which is a heat seeking manpad launched guided missile. A weapon alerting and cueing system for a manpad weapon system such as the Stinger missile is commonly comprised of a portable weapon computer terminal and a gunner unit. The weapon computer terminal is configured to receive radar track reports from a remote radar sensor system and to receive weapon pointing information from the gunner unit. Pursuant to the radar track reports and the weapon pointing information, the portable weapon computer terminal provides cueing information to the gunner unit which controls a cueing sight that visually guides a weapon operator to cue the weapon launcher to a selected radar detected aircraft. Typically, the portable weapon computer terminal is operated by one operator while the weapon launcher unit is operated by another operator, and the portable weapon computer terminal and the weapon launcher are interconnected by a cable.

Considerations with known weapon alerting and cueing systems include the need for two persons to operate each manpad weapon, the cable interconnection between the portable computer terminal and the weapon launcher, and the lack of coordination of the operation of a plurality of manpad weapons located at a single weapon site.

SUMMARY OF THE INVENTION

It would therefore be an advantage to provide a weapon alerting and cueing system for coordinating the operation of a plurality of manpad weapons.

Another advantage would be to provide a weapon alerting and cueing system having components that are not interconnected by encumbering cables.

The foregoing and other advantages are provided by the invention in a weapon alerting and cueing system that includes a weapon terminal responsive to radar track reports for radar detected aircraft; a first weapon launcher operated by a first weapon operator; a first weapon pointing sensor associated with the first weapon launcher for providing azimuth and elevation information about the first weapon launcher; a first cueing sight associated with the first weapon launcher for providing visual pointing cues to the first weapon operator; a first weapon cueing processor responsive to the radar track reports, the weapon terminal, and the first pointing sensor for controlling the first cueing sight such that the first cueing sight provides visual cues for cueing the first weapon launcher to a selected radar detected aircraft; a second weapon launcher operated by a second weapon operator; a second weapon pointing sensor associated with the second weapon launcher for providing azimuth and elevation information about the second weapon launcher; a second cueing sight associated with the second weapon launcher for providing visual pointing cues to the second weapon operator; a second weapon processor responsive to the radar track reports, the weapon terminal, and the second pointing sensor for controlling the second cueing sight such that the second cueing sight provides visual cues for cueing the second weapon launcher to a selected radar detected aircraft; and a plurality of radio frequency modems respectively connected to the weapon terminal, the first weapon processor, and the second weapon processor for interconnecting the weapon terminal, the first weapon processor and the second weapon processor. Each of the first and second weapon launchers includes monitoring apparatus for monitoring operation and performance, and for providing operational and performance data to the respective weapon cueing processors. A data collection unit is provided for receiving and storing selected messages broadcast by the radio frequency modems, including messages containing operational and performance data provided by the monitoring apparatus of the first and second weapon launchers.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
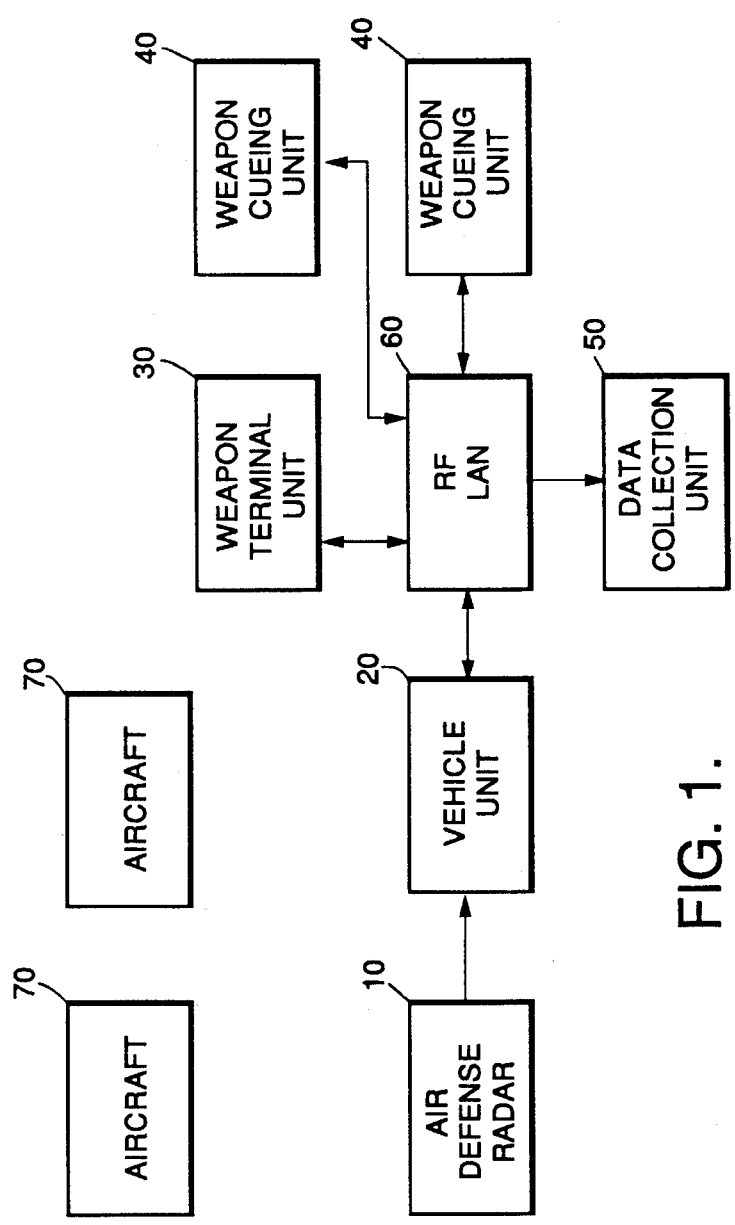
FIG. 1 is a block diagram of an implementation of a multiple weapon alerting and cueing system in accordance with the invention.

In the following detailed description and in the several figures of the drawing, like elements are identified with like reference numerals.

Referring now to FIG. 1, set forth therein is a block diagram of an implementation of a weapon alerting and cueing system in accordance with the invention. The weapon alerting and cueing system generally includes a vehicle unit 20, a portable weapon computer terminal 30, a plurality of weapon cueing units 40, and a data collection unit 50. The vehicle unit 20, the portable weapon computer terminal 30, the weapon cueing units 40, and the data collection unit 50 are interconnected by a wireless radio frequency (RF) local area network (LAN) 60 which is conventionally comprised of RF modems that transmit and receive RF signals. In particular, a plurality of RF modems are respectively connected to the vehicle unit 20, the portable computer terminal unit 30, the weapon cueing units 40, and the data collection unit 50 for interconnecting such units, whereby such units are interconnected without interconnecting cables. In accordance with conventional RF LAN protocol, data is communicated between the units connected to the RF LAN 60 in the form of messages broadcast on the network by the units, wherein each message includes a message type identification and optionally a destination address that specifies a particular unit connected to the RF LAN 60. All units connected to the RF LAN 60 receive messages broadcast on the RF LAN 60, and each unit is particularly configured to process only messages of selected message types, and/or messages that are of selected message types and which contain the destination address of the particular unit. In other words, each unit is configured to process only selected messages as determined by message type and/or message type and destination address.

The weapon alerting and cueing system receives by radio communications radar track reports provided by an air defense radar system 10 as to a plurality of aircraft 70 that are detected in the region of coverage of the radar system 10. As described more fully herein, radar track reports are utilized to cue weapon launchers to selected ones of the aircraft 70 detected by the radar system. For ease of reference, a selected aircraft is sometimes referred to as an aircraft target or a target aircraft. The air defense radar system 10 comprises for example a 3D radar system that provides radar track reports that include position and velocity information for the detected aircraft relative to a predetermined three-dimensional Cartesian coordinate system. The radar track reports further include the type of the detected aircraft (e.g., fixed wing or rotary wing), and an identification of whether a detected aircraft is hostile, friendly, or unknown.

Figure 2:
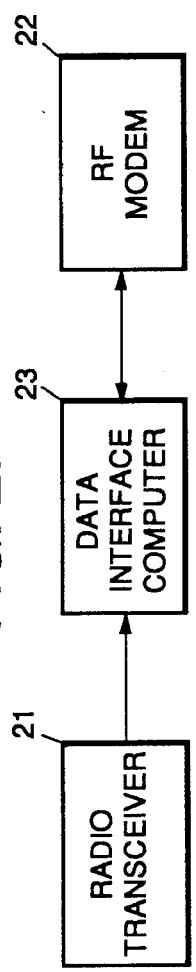
FIG. 2 is a block diagram illustrating the major components of the vehicle unit of the system of FIG. 1.

Referring now to FIG. 2, the vehicle unit 20 more particularly includes a radio transceiver 21 for receiving radar track reports from the air defense radar system 10 and a data interface computer 23 responsive to the radio transceiver. The data interface computer 23 formats the radar track reports into Radar Track Report messages which are provided to an RF modem 22 of the RF LAN 60. The RF modem 22 broadcasts the Radar Track Report messages on the RF LAN 60 so that the Radar Track Report messages can be received by other units in the weapon alerting and cueing system.

Figure 3:
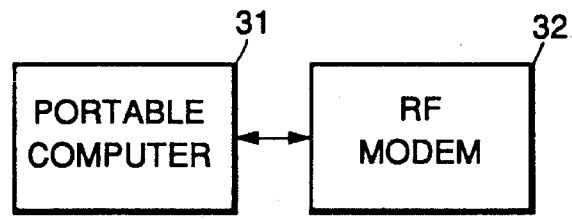
FIG. 3 is a block diagram illustrating the major components of the portable weapon computer terminal of the system of FIG. 1.

Referring now to FIG. 3, the weapon computer terminal 30 comprised of a portable computer 31 which is connected to an RF modem 32 of the RF LAN 60. In accordance with conventional techniques, the portable computer 31 provides appropriately formatted messages to the RF modem 32, decodes messages received by the RF modem 32, and processes those messages which it has been configured to process.

Figure 4:
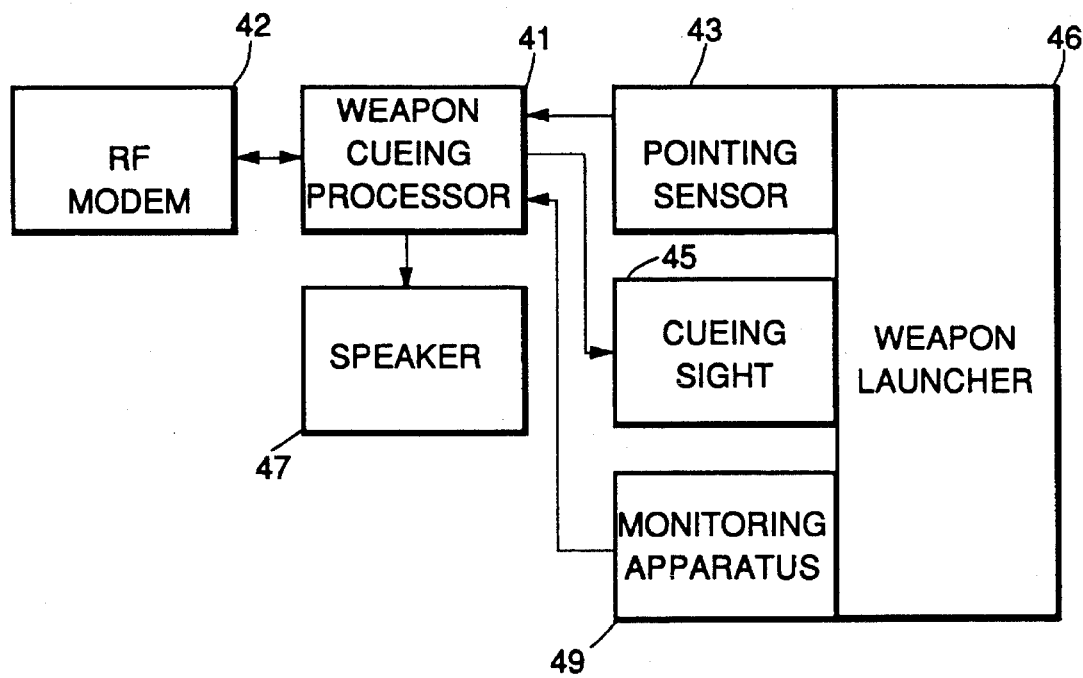
FIG. 4 is a block diagram illustrating the major components of a weapon cueing unit of the system of FIG. 1.

Referring now to FIG. 4, the weapon cueing unit 40 includes a weapon cueing processor 41, a pointing sensor 43 mounted on an associated weapon launcher 46, a cueing sight 45 which is also mounted on the weapon launcher 46 and is controlled by the weapon cueing processor 41, and monitoring apparatus 49 which provides to the weapon cueing processor 41 data regarding the performance and operation of the weapon launcher 46, for example. An audio speaker 47 is driven by the weapon cueing processor to provide audible signals to the operator of the weapon launcher 46. The weapon cueing processor 41 is connected to an RF modem 42 of the RF LAN 60. In accordance with conventional techniques, the weapon cueing processor 41 provides to the RF modem 42 appropriately formatted messages for broadcast, decodes messages received by the RF modem, and processes those messages which it has been configured to process. By way of illustrative example, the weapon cueing processor 41 and the RF modem 42 are implemented as a belt mounted portable device which is worn by the weapon operator for the weapon launcher 46. By way of further illustrative example, the cueing sight 45 comprises a display as disclosed in commonly assigned U.S. Pat. No. 4,730,104 issued to Rogers on Mar. 8, 1988, for "PERIPHERAL VISION GUIDANCE DISPLAY", incorporated herein by reference. That display includes four red lights to visually cue the weapon operator to point the weapon launcher up or down, and/or left or right, and four green lights to indicate that the radar detected aircraft to which the weapon launcher is being cued is within the range of the weapon to be launched. Also by way of illustrative example, the pointing sensor 43 comprises a digital compass/inclinometer that provides the azimuth and elevation of the pointing direction of the weapon launcher.

Figure 5:
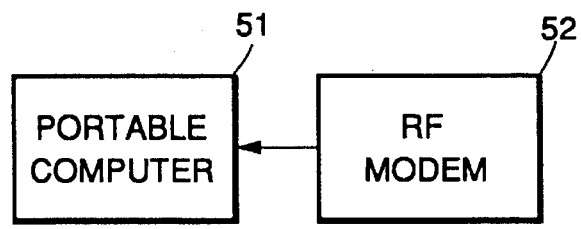
FIG. 5 is a block diagram illustrating the major components of the data collection unit of the system of FIG. 1.

Referring now to FIG. 5, the data collection unit 50 more is particularly comprised of a portable computer 51 which is connected to an RF modem 52 of the RF LAN 60. In accordance with conventional techniques, the portable computer 51 decodes messages received by the RF modem and processes those messages which it has been configured to process.

The weapon computer terminal 30 is operated by a weapon commander and processes Radar Track Report messages broadcast by the vehicle unit 20. Pursuant to the Radar Track Report messages, the weapon computer terminal 30 produces a visual display, for example on a display screen of the portable computer 31 (FIG. 3) that implements the weapon computer terminal 30, that includes an air situation display and a parameter display. In accordance with prior known weapon cueing systems, the air situation display is a map view that depicts the positions and velocities of radar detected aircraft, wherein position is indicated relative to the position of the weapon unit which is utilizing the weapon alerting and cueing system that is comprised of the vehicle unit, the weapon terminal, the weapon cueing units, and the data collection unit. For example, a symbolic representation of the weapon unit is positioned at the center of the display. Each detected aircraft is depicted with a preselected symbology that indicates if the detected aircraft is friendly, hostile or unknown and whether the detected aircraft is a fixed or rotary wing aircraft. The parameter display includes parameter information as to detected aircraft such as range, azimuth, elevation, and velocity, which are derived from the Radar Track Report messages. The weapon commander selects a detected aircraft as a target aircraft for engagement and a weapon cueing unit for engaging the selected target aircraft, for example pursuant to inputs on the keyboard or other input device of the portable computer 31 (FIG. 3). After the target aircraft and weapon cueing unit combination has been selected, the weapon commander inputs an engage command via the keyboard or other input device, which causes a Weapon Control Order message that contains an engage order to be broadcast over the RF LAN 60. The Weapon Control Order message that contains the engage order also contains an identification of the target aircraft and the weapon cueing unit selected to engage the target aircraft. The Weapon Control Order message is utilized for providing other orders such as an alert order or a cease engagement order. In addition to Weapon Control Order messages, the weapon computer terminal broadcasts other messages such as a Weapon Unit Location message which contains the location of the weapon unit utilizing the weapon alerting and cueing system, for example relative to an appropriate coordinate system that is compatible with the Radar Track Report messages broadcast by the vehicle unit 20. The situation display provided by the computer 31 can also indicate the status of each of the weapon cueing units: the direction in which is each of the associated weapon launchers is pointing, the target aircraft that are engaged and the weapon cueing units engaging such engaged target aircraft, the pointing errors of the weapon cueing units, the detected aircraft currently selected as target aircraft for engagement commands, and the weapon cueing units selected for engagement of the detected aircraft currently selected for engagement commands. For example, the direction status of a weapon cueing unit is represented by an azimuth vector emanating from a point that corresponds to the current position of the weapon unit utilizing the weapon alerting and cueing system, which provides a visual indication if a weapon operator is engaging the appropriate target aircraft. The pointing direction status information and the pointing error information displayed by the weapon terminal 30 are derived from Weapon Cueing Unit Status messages broadcast by the weapon cueing units on the RF LAN 60.

Each weapon cueing unit 40 is configured to respond to each Weapon Control Order message that contains the unique identification of the weapon cueing unit, and alerts the weapon operator of the order contained in such message, for example by causing the speaker 47 to produce different audible signals that are respectively associated with the different orders. In other words, each order has a unique audible signal associated therewith. Pursuant to an alert order, the weapon operator is alerted to the possibility of engaging a radar detected aircraft. A cease order is intended to direct the weapon operator to cease an engagement with a target aircraft. Pursuant to an engage order, the weapon cueing processor 41 controls the associated cueing sight 45 to cue or direct the weapon operator to maneuver the weapon launcher 46 in such a manner as to acquire, track, and fire on a target aircraft that is the subject of the engage order. In particular, the weapon cueing processor 41 generates pointing error information relative to the target aircraft by processing (a) the weapon launcher pointing information provided by the pointing sensor 43, (b) the weapon unit location provided by the Weapon Unit Location messages broadcast by the weapon computer terminal 30, and (c) the Radar Track Report messages broadcast by the vehicle unit 20. From the pointing error information, pointing correction information is generated and provided to the cueing sight 45 which provides visual up, down, left, right cues to the weapon operator, wherein the cues are indicative of movements necessary to acquire and track the target aircraft. After a weapon launcher operator starts to engage a target aircraft, the associated weapon cueing unit automatically broadcasts Weapon Cueing Unit Status messages that contain the identification of the broadcasting weapon cueing unit along with the pointing direction of the associated weapon launcher, the pointing error of the associated weapon launcher, and other status information. The Weapon Cueing Unit Status messages also include the operational and performance data provided by the monitoring apparatus 49. Such operational and performance data includes, for example, data indicating weapon activation, acquisition of target, weapon uncaging, and weapon firing, and is useful in evaluating the performance of the weapon launcher, the weapon operator, and the weapon alerting and cueing system. Such operational and performance data is also useful in training, in which case the weapon cueing unit is utilized in conjunction with a training device instead of a weapon launcher.

The data collection unit 50 receives the messages broadcast on the RF LAN and is configured to store selected messages for future evaluation and analysis. More particularly, the selected messages are time stamped with the current time of day and stored in a data storage device such as a hard disk drive or a tape drive. The stored messages can provide information about engagement such as when a weapon operator acquired a target and when the weapon was fired. Also, the stored messages can be used to reconstruct each engagement including the location of the target at different times during the engagement.

Set forth below are tables that identify the messages broadcast by respective units and the units that process such messages, except the data collection unit. As described earlier, the data collection unit is configured to store selected messages.

| MESSAGE TYPE | BROADCAST BY | PROCESSED BY |
| --- | --- | --- |
| Radar Track Report | Vehicle Unit | Weapon Terminal and Weapon Cueing Units |
| Weapon Control Order | Weapon Terminal | Selected Weapon Cueing Unit |
| Weapon Unit Location | Weapon Terminal | All Weapon Cueing Units |
| Weapon Cueing Unit Status | Weapon Cueing Units | Weapon Terminal |

While the foregoing illustrative example of the invention includes the monitoring apparatus 49 and the data collection unit 50 for providing operational and performance instrumentation, it should be appreciated that the monitoring apparatus and/or the data collection unit can be omitted, depending upon the particular implementation requirements.

The foregoing has been a disclosure of a weapon alerting and cueing system that advantageously employs RF communications to interconnect the components of the system, and which advantageously provides for collection of data regarding the operation of the weapon alerting and cueing system.

Although the foregoing has been a description and illustration of specific embodiments of the invention, various modifications and changes thereto can be made by persons skilled in the art without departing from the scope and spirit of the invention as defined by the following claims.

What is claimed is:

1. A weapon alerting and cueing system comprising:

a weapon terminal responsive to radar track reports for radar detected aircraft, and for identifying selected radar detected aircraft as aircraft targets;

a first weapon launcher operated by a first weapon operator;

a first weapon pointing sensor associated with said first weapon launcher for providing azimuth and elevation information about said first weapon launcher;

a first cueing sight associated with said first weapon launcher for providing visual pointing cues to the first weapon operator;

first weapon cueing processor means responsive to said radar track reports, said weapon terminal, and said first pointing sensor for controlling said first cueing sight such that said first cueing sight provides visual cues for cueing said first weapon launcher to one of said aircraft targets;

a second weapon launcher operated by a second weapon operator;

a second weapon pointing sensor associated with said second weapon launcher for providing azimuth and elevation information about said second weapon launcher;

a second cueing sight associated with said second weapon launcher for providing visual pointing cues to the second weapon operator;

second weapon processor means responsive to said radar track reports, said weapon terminal, and said second pointing sensor for controlling said second cueing sight such that said second cueing sight provides visual cues for cueing said second weapon launcher to one of said aircraft targets; and a plurality of RF modems respectively connected to said weapon terminal, said first weapon processor, and said second weapon processor for interconnecting said weapon terminal, said first weapon processor and said second weapon processor, such that said weapon terminal, said first weapon processor, and second weapon processor exchange data messages via said RF modems.

2. The weapon alerting and cueing system of claim 1 further including:

data collection means for storing data messages exchanged by said weapon terminal, first weapon processor, and said second weapon processor via said plurality of RF modems; and an RF modem connected to said data collection means for receiving said data exchanged by said weapon terminal, said first weapon processor, and said second weapon processor.

3. The weapon alerting and cueing system of claim 1 further including:

first monitoring means for monitoring the operation and performance of said first weapon launcher for providing operation and performance data to said first weapon cueing processor; and second monitoring means for monitoring the operation and performance of said first weapon launcher for providing operation and performance data to said second weapon cueing processor.

4. A weapon alerting and cueing system comprising:

a weapon terminal responsive to radar track reports for radar detected aircraft, and for identifying selected radar detected aircraft as aircraft targets;

a plurality of weapon launchers;

a plurality of weapon pointing sensors respectively associated with said weapon launchers for providing respective azimuth and elevation information about said weapon launchers;

a plurality of cueing sights respectively associated with said weapon launchers for providing visual pointing cues for cueing of said weapon launchers;

a plurality of weapon processor means responsive to said radar track reports, said weapon terminal, and said pointing sensors for controlling said cueing sights such that said cueing sights provide visual cues for cueing said weapon launchers to said aircraft targets; and a plurality of RF modems for interconnecting said weapon terminal and said weapon cueing processors without interconnecting cables, such that said weapon terminal and said weapon cueing processors communicate data via said RF modems.

5. The weapon alerting and cueing system of claim 4 further including:

data collection means for storing data messages communicated by said weapon terminal and said weapon processors via said plurality of RF modems; and an RF modem connected to said data collection means for receiving said data communicated by said weapon terminal, said first weapon processor, and said second weapon processor.

6. The weapon alerting and cueing system of claim 4 further including a plurality of monitoring means for respectively monitoring the operation and performance of said weapon launchers for providing operation and performance data to said weapon cueing processors.

* * * * *